(12) United States Patent
Theis et al.

(10) Patent No.: US 11,188,034 B2
(45) Date of Patent: Nov. 30, 2021

(54) SYSTEM FOR MONITORING AND INFLUENCING OBJECTS OF INTEREST AND PROCESSES CARRIED OUT BY THE OBJECTS, AND CORRESPONDING METHOD

(71) Applicant: Dallmeier electronic GmbH & Co. KG, Regensburg (DE)

(72) Inventors: Martin Theis, Regenstauf (DE); Michael Fischer, Regensburg (DE)

(73) Assignee: Dallmeier electronic GmbH & Co. KG, Regensburg (DE)

( * ) Notice: Subject to any disclaimer, the term of this patent is extended or adjusted under 35 U.S.C. 154(b) by 0 days.

(21) Appl. No.: 15/578,450

(22) PCT Filed: Jul. 31, 2015

(86) PCT No.: PCT/DE2015/000389
§ 371 (c)(1),
(2) Date: Nov. 30, 2017

(87) PCT Pub. No.: WO2017/020879
PCT Pub. Date: Feb. 9, 2017

(65) Prior Publication Data
US 2018/0150034 A1 May 31, 2018

(51) Int. Cl.
*G05B 9/02* (2006.01)
*G06Q 50/26* (2012.01)
(Continued)

(52) U.S. Cl.
CPC ............... *G05B 9/02* (2013.01); *G06Q 10/06* (2013.01); *H04W 4/021* (2013.01); *G06Q 50/26* (2013.01); *G08B 21/18* (2013.01)

(58) Field of Classification Search
CPC ......... G05B 9/02; H04W 4/021; G06Q 10/06; G06Q 50/26; G08B 21/18
See application file for complete search history.

(56) References Cited

U.S. PATENT DOCUMENTS 3,714,650 A * 1/1973 Fuller ................ G08G 1/127
342/42
6,359,647 B1 3/2002 Sengupta et al.
(Continued)

FOREIGN PATENT DOCUMENTS

DE 10029784 A1 11/2001
EP 1909243 4/2008
(Continued)

OTHER PUBLICATIONS

Australian Patent Office, Examination Report No. 2, dated Jun. 3, 2021.

*Primary Examiner* — Jennifer L Norton
(74) *Attorney, Agent, or Firm* — Welsh Flaxman & Gitler LLC

(57) ABSTRACT

The invention relates to a system for monitoring and influencing at least one object of interest and/or processes carried out by the object, containing: at least one object for obtaining information, which is designed to obtain information on the object of interest and at least one influencing object which is designed to exert influence on the object of interest. The object for obtaining information and the influencing object being subject to a geo-referencing process. The system also includes a central control unit which is coupled to the object for obtaining information and the influencing The central control unit controls an exchange of information with or between the object for obtaining information and the influencing object, requests information from the object for obtaining information in response to an alarm trigger, and on the basis of information from the object for obtaining information causes the influencing object to carry out measures for influencing the object of interest and/or processes carried out by the object. The system also includes a communication network via which the exchange of infor-
(Continued)

Video cameras at scene of accident mation between the objects or between the objects and the central control unit is carried out.

10 Claims, 9 Drawing Sheets

(51) Int. Cl.
  *G08B 21/18* (2006.01)
  *G06Q 10/06* (2012.01)
  *H04W 4/021* (2018.01)

(56) References Cited

U.S. PATENT DOCUMENTS

| | | | |
|---|---|---|---|
| 6,690,374 B2 | 2/2004 | Park et al. | |
| 7,515,065 B1* | 4/2009 | Bygrave | G08G 1/0965 340/901 |
| 2004/0004542 A1 | 1/2004 | Faulkner | |
| 2005/0209770 A1* | 9/2005 | O'Neill | G01C 21/3407 701/117 |
| 2006/0033615 A1* | 2/2006 | Nou | G08B 13/19647 340/539.13 |
| 2006/0095199 A1* | 5/2006 | Lagassey | G07C 5/008 701/117 |
| 2012/0206605 A1 | 8/2012 | Buehler et al. | |
| 2013/0088349 A1* | 4/2013 | McSheffrey, Sr. | G08B 25/006 340/521 |
| 2014/0368643 A1* | 12/2014 | Siegel | G08B 13/19695 348/143 |
| 2016/0005306 A1* | 1/2016 | McWhirter | G08B 13/196 340/539.1 |
| 2017/0276495 A1* | 9/2017 | Krishnan | G08G 1/096741 |
| 2018/0367968 A1* | 12/2018 | Golichowski | G06Q 10/063114 |
| 2019/0191278 A1* | 6/2019 | Singh | H04W 4/029 |
| 2020/0143651 A1* | 5/2020 | Beyer | H04W 4/90 |
| 2020/0145808 A1* | 5/2020 | O'Connor | G01K 1/026 |
| 2020/0160066 A1* | 5/2020 | Tani | G06Q 10/06 |
| 2020/0160735 A1* | 5/2020 | Kim | G08G 1/0965 |
| 2020/0242922 A1* | 7/2020 | Dulberg | G08G 1/0116 |
| 2021/0004734 A1* | 1/2021 | Conroy | |
| 2021/0048829 A1* | 2/2021 | Deyle | G05D 1/0246 |

FOREIGN PATENT DOCUMENTS

| | | |
|---|---|---|
| JP | 2001-076031 | 3/2001 |
| JP | 2001-179668 | 7/2001 |
| JP | 2012-507090 | 3/2012 |
| RU | 2417393 C2 | 2/2005 |
| WO | WO2005/093531 | 2/2005 |

* cited by examiner

GUI window for recording an emergency call

| Emergency call –update information | |
|---|---|
| who | when |
| CallerID: +44 779 1122 551 | today |
| Name: Sean Grant | 23:13:25 CET |
| Carrier: O2 | where |
| Address: 127 Ruabon Rd L137RB | lat: 53.0400174 |
| | lon: 2.9999308 |
| what | |
| | |

Fig. 2

List of all incidents

| Saved Searches | Type | Date | Assigned to | Event-Description | | | | Car Accident |
|---|---|---|---|---|---|---|---|---|
| All Items | Accident | Today 23:13 | 1275 2 D15 Marks | PL/12/159 Traffic Accident: two cars collided while turning off | | | | |
| My Alerts | | Time | Size | Format | Uploaded by | Relevance | description | |
| My Bookmarks | | Today 23:25 | 72kB | Text txt | 01 S.Clark | High | First interview with both involved drivers- short description of events by eyewitness | Main Street |
| Search Details | | Today 23:27 | 366 kB | Image jpg | DC M.Petifier | Evidence | Damage to car 1-front | |
| >Type | | Today 23:31 | 768 kB | Image jpg | DC M.Petifier | Evidence | Damage to car 1-side | |
| >Date | | Today 23:27 | 3,48 MB | Video mp4 | DC M.Petifier | Evidence | Videofootage by mobile cam from officer on scene | |
| >Assigned To | | Today 23:27 | 456 kB | Image jpg | DC M.Petifier | Evidence | Damage to car 2-front | Investigate  Delegate |
| >Criticality | | Today 23:31 | 238kB | Image jpg | DC M.Petifier | Evidence | Damage to car 2-front | Comment  Flag |
| >Areas | | Today 23:27 | 456 kB | Video mp4 | DC M.Petifier | Evidence | Damage to car 2-front detail left | |
| | Assault | Today 23:11 | 2564-5:DC J.Fox | AS/14/756 Underground station:3 violently assaulting elderly person | | | | Report PL/12/159.txt |
| | Robbery | Today 23:09 | 3256-1: DI M.Platt | RB/03/876 Victim was robbed after taking cash from ATM | | | | |
| | Theft | Today 23:08 | 1664-5 DI F.Jones | TH/14/192 Petty theft- Shoplifting at Sainsbury's | | | | |

FIG. 9

SYSTEM FOR MONITORING AND INFLUENCING OBJECTS OF INTEREST AND PROCESSES CARRIED OUT BY THE OBJECTS, AND CORRESPONDING METHOD

BACKGROUND OF THE INVENTION

The present invention relates to a system and a method for observing and manipulating objects of interest as well as processes carried out thereby and in particular a system and a method for planning, deployment and/or support of security services.

German Patent No. DE 100 29 784 A1 describes a device for observing and manipulating objects, areas, processes etc., which consists of a plurality of modules and which distributes spatial data and information as well as personnel operations to a plurality of personnel via a telecommunications network in order to relieve the personnel and can thus improve the quality of the services, reduce costs and increase the attraction to a wider group of people. In this regard, a wide variety of information is collected and processed. Emergency teams are selected and guided using the information obtained and processed. However, it is not known therefrom that the objects serving to obtain the information and manipulate the objects of interest are provided with a georeferencing positioning, that the telecommunications network is configured as a function of the structure or the performance capacity of the objects in question or provide means for logging the handling of the objects.

It is an objective of the present invention is to further refine a system known from German Patent No. DE 100 29 784 A1 and to provide a corresponding method.

SUMMARY OF THE INVENTION

Accordingly, a system is provided for monitoring and manipulating at least one object of interest and/or processes carried out by the object, having: at least one object for acquiring information which is designed to acquire information about the object of interest and at least one manipulating object which is designed to exert influence on the object of interest. The object for acquiring information and the manipulating object are subject to georeferencing. The system also includes a central control unit which is coupled to the object for acquiring information and the manipulating object. The central control unit controls an exchange of information with or between the object for acquiring information and the manipulating object, requests information from the object for acquiring information in response to triggering of an alarm, and on the basis of information from the object for acquiring information authorizes the manipulating object to instigate measures for manipulating the object of interest and/or processes carried out by the object. The system also includes a communications network via which the information is exchanged between the objects or between the objects and the central control unit.

An object for acquiring information, for example a video camera, is directed at an object of interest, for example a road intersection, in order to acquire a video stream from it. The video camera is connected via a communications network, for example a fixed-line network, to a central control unit which, by means of an image analysis device, is able to detect structures in the video stream acquired from the video camera which require external intervention. To this end, the central control unit is connected to a manipulating object, for example an emergency vehicle, via a communications network, for example a mobile phone network. With the aid of the image analysis of the video stream from the video camera, if the central control unit then determines that, for example, an unusual event has occurred or is occurring at the road intersection, for example a road accident with injuries to individuals which requires an external intervention, then an alarm is triggered to this effect and an emergency vehicle is dispatched as quickly as possible to the road intersection, i.e. the scene. Emergency personnel who are conveyed to the scene by the emergency vehicle can then take the necessary steps such as, for example, securing the scene and seeing to the injured individuals. In this manner, a reaction to an emergency situation is initiated in an effective manner.

The objects of interest in this regard should be considered to be i) immovables, in particular buildings, roads, road intersections, open spaces or areas, movables, in particular vehicles, aircraft, ships or portable devices, or iii) living beings, in particular people, animals or plants or parts thereof.

The object for acquiring information is preferably a sensor, a camera or a microphone which is in a stationary or mobile position. In this manner, a great deal of information or data of various types can be obtained from the object of interest, whereupon incidents at the object of interest can be analyzed better.

The manipulating object is preferably an emergency vehicle, emergency equipment or a robot if an active intervention is required at the scene, whereupon, as a function of the event, a planned reaction can be specified. In this regard, the emergency equipment or robot may also be brought to the scene by means of the emergency vehicle. In the case of an incident which does not require any direct intervention, then it is sufficient simply to provide information at the scene or to people there in order not to cause any anxiety at the scene because of uncertainty. Manipulating objects of this type are a monitor or a loudspeaker. The provision of information via monitor or loudspeaker may be a good idea even during the preliminary stages of an active intervention.

Cooperation of the object for acquiring information and/or the manipulating object may then be effective if the position of the respective objects is known. In this regard, georeferencing of the respective objects is carried out by assigning coordinates, preferably with the aid of a list, by GPS tracking, WLAN or WiFi-based positioning or by image analysis.

The operation of the system is initiated by triggering an alarm which is preferably carried out by means of a remote message, by signals from the object for acquiring information or from the assessment thereof. In a simple case, the alarm is triggered by a pedestrian who notices a specific danger and actuates an alarm signal generator, whereupon, as described above, the central control unit can then commence analyzing the incident (the term "incident" will sometimes also be referred to below as an "event") and determining a reaction thereto.

In order to allow various types of objects for acquiring information and manipulating objects to cooperate, the communications network is preferably configured as a mobile phone network, fixed-line network, internet, LAN (local area network), WAN (wide area network) or as a group of at least two of said networks. In this manner, the stationary or mobile disposition of the respective objects as well as their distances to a distribution or hotspot are taken into account.

The object for acquiring information and/or the manipulating object each respectively have a local control system which controls the associated object and/or the incoming or outgoing communication, thus relieving the central control system and increasing the efficiency of the system thereby.

The central control unit is preferably configured to determine the reason for triggering the alarm in communication with the object for acquiring information and/or the manipulating object, to determine the object of interest concerned and its position and to specify a reaction thereto which should be the response to initiation of the alarm. This is achieved by storing a plurality of events which occurred in the past in this or similar manners, and of reactions which were successful in that regard. The reactions are associated with the incidents so that, upon analyzing or detecting an incident, the appropriate reaction can be selected and specified.

Preferably, a plurality of objects for acquiring information and/or a plurality of manipulating objects are available, whereupon this enables enough information to be obtained from the scene to allow a meaningful analysis of an incident to be carried out and to send several manipulating objects to the scene or to select the most suitable to send from a plurality of manipulating objects.

In particular, the central control unit is configured in a manner such that, as a function of the specified reaction, the availability of manipulating objects as well as their qualification for implementing the specified reaction and their estimated time of arrival at the scene at which the specified reaction should be implemented, to select the manipulating object or objects which should implement the specified reaction and send them to the scene. Thus, preferably, the manipulating objects which arrive at the scene have the best qualifications for the specified reaction and are relatively closely positioned to the scene at the time the alarm is triggered. In this manner, the effectiveness and efficiency of the system is further enhanced.

Furthermore, the central control unit is configured in a manner such that it compiles deployment plans for the selected manipulating objects for bringing about the specified reaction. Deployment plans for previous events and reactions thereto have been stored and are called up as necessary and can be adapted with the aid of a program as a function of the circumstances, in particular considering the selected manipulating objects and their characteristics or capabilities. The selected manipulating objects then carry out the specified deployment plans, whereupon the specified and thus the desired reaction is targeted in an efficient and effective manner.

The central control unit is preferably configured so as to authorize a selected manipulating object at the scene to prepare witness statements, action logs and/or final reports, wherein statements from pedestrians are recorded using a microphone and undergo a computer analysis or interpretation. Again, this produces computer-supported action logs from which finally, a final report is drawn up, again with computer support. In general, this means that the effectiveness and efficiency of the system is further enhanced.

The features discussed above may be separate or be combined with each other.

Furthermore, a method for monitoring and manipulating at least one object of interest and/or processes carried out by the object is provided, having the steps of:
defining at least one object for acquiring information which is configured to acquire information regarding the object of interest, defining at least one manipulating object which is configured to exert influence on the object of interest, wherein the object for acquiring information and the manipulating object are subject to georeferencing, with the further steps of:
carrying out a central control of the object for acquiring information and the manipulating object, whereupon a flow of information to or from the object for acquiring information or the manipulating object as well as an exchange of information with or between the object for acquiring information and the manipulating object is controlled and, in response to triggering an alarm, information is requested from the object for acquiring information and on the basis of the information from the object for acquiring information, the manipulating object is authorized to carry out measures to influence the object of interest and/or processes carried out by it, and providing a communications network via which the information is exchanged between the objects or the objects and the central control unit.

The objects of interest in this regard should be considered to be i) immovables, in particular buildings, roads, road intersections, open spaces or areas, movables, in particular vehicles, aircraft, ships or portable devices, or living beings, in particular people, animals or plants or parts thereof.

In the method, the object for acquiring information is preferably a sensor, a camera or a microphone which may be in a stationary or mobile position.

In the method, the manipulating object is preferably an emergency vehicle, emergency equipment, a robot, a monitor or a loudspeaker.

The georeferencing of the object for acquiring information and/or the manipulating object is carried out by assigning coordinates, preferably with the aid of a list, by GPS tracking, WLAN or WiFi-based positioning or by image analysis.

The alarm is preferably triggered by means of a remote message, by signals from the object for acquiring information or from the assessment thereof.

The communications network is preferably configured as a mobile phone network, fixed-line network, internet, LAN (local area network), WAN (wide area network) or as a group of at least two of said networks.

The object for acquiring information and/or the manipulating object is preferably respectively locally controlled, whereupon the associated object and/or the incoming or outgoing communication is controlled.

The central control is preferably carried out in a manner such that it determines the reason for triggering the alarm in communication with the object for acquiring information and/or the manipulating object, it determines the object of interest concerned and its position and it specifies a reaction thereto which should be the response to initiation of the alarm.

Preferably, a plurality of objects for acquiring information and/or a plurality of manipulating objects are provided.

The central control is preferably configured in a manner such that, as a function of the specified reaction, the availability of manipulating objects as well as their qualification for implementing the specified reaction and their estimated time of arrival at the scene at which the specified reaction should be implemented, the manipulating object or objects are selected which should implement the specified reaction and are sent to the scene.

The central control is preferably carried out in a manner such that it compiles deployment plans for the selected manipulating object or objects for bringing about the specified reaction.

The central control is preferably carried out in a manner such that a selected manipulating object at the scene is authorized to prepare witness statements; action logs and/or a final report.

The steps of the method defined above may be carried out alone or combined with each other. The advantages of the steps of the method correspond to the features of the device.

The above method (as well as the individual steps of the method) can be carried out by a computer system into which a data carrier is installed on which the method is stored in a computer-readable form.

BRIEF DESCRIPTION OF THE DRAWINGS

The present invention will now be described in respect of a preferred embodiment. In this regard, some of the aspects of the present invention will be described without reference to the explanatory figures; however, other aspects will be described with reference to the explanatory figures, in which:

FIG. 2 shows the data known to the system upon initiation of an alarm;

FIG. 9 shows a list of the events/incidents processed and stored in the system.

DETAILED DESCRIPTION OF THE INVENTION

Figure 1:
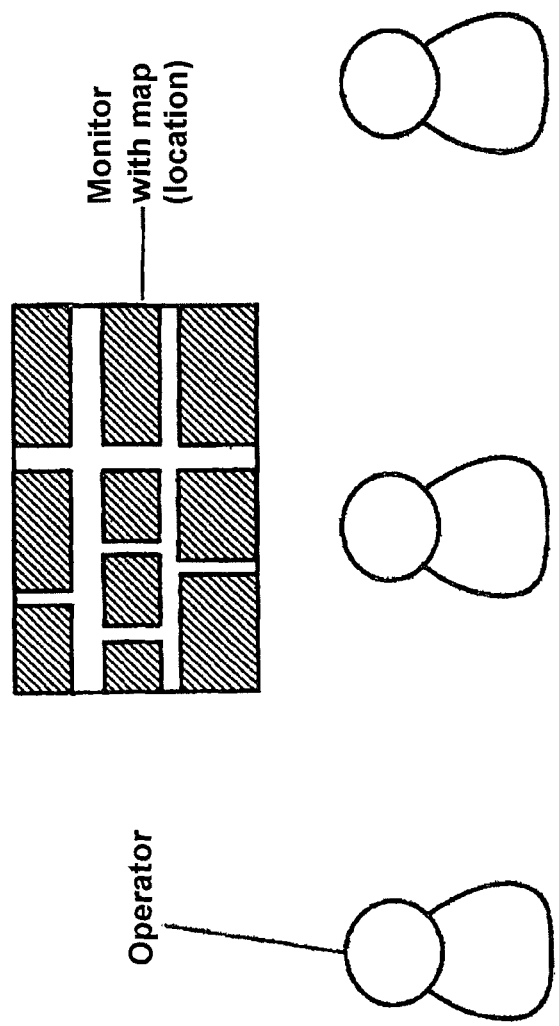
FIG. 1 shows a control center.

In a preferred embodiment of the present invention, a system for observing and manipulating objects as well as processes carried out by the objects contains a plurality of objects of various categories (objects of interest, objects for acquiring information, manipulating objects), a central control unit which controls the exchange of information with the objects and between the objects and which, upon triggering of an alarm, authorizes measures for manipulating one or more objects, and a communications network via which the exchange of information occurs between the objects and/or the objects and the central control unit. (Unless specification is otherwise necessary in the following, the objects of interest, the objects for acquiring information and the manipulating objects will simply be referred to as "objects").

The objects of interest underlying the observing or manipulating by the system are, for example, i) immovables, in particular buildings, roads, road intersections, open spaces or areas, movables, in particular vehicles, aircraft, ships or portable devices, or living beings, in particular people, animals or plants or parts thereof. Thus, for example, it may be of interest, in the case in which the object of interest is an open space on which a certain number of people are located, the number depending on the date and time of day, a scenario may be observed which is not typical of the open space and which is associated with a heightened risk.

Objects for acquiring information such as (video) cameras, microphones and/or other sensors such as temperature, pressure or moisture sensors are located at suitable positions on the open space in a stationary or mobile position in order to obtain multiple types of information concerning the open space.

The objects for acquiring information are connected to a communications network to transmit data so that a uni-directional or bi-directional flow of data is possible. Optionally, the objects for acquiring information may have a local control unit via which data flows in or out, wherein, depending on the function of the object for acquiring information, the flow of data may undergo a certain amount of processing. Examples in this regard are devices for counting individuals or for recognizing vehicle number plates, in which cases a local image analysis is carried out.

Both the local control unit for the objects for acquiring information and the central control unit are configured such that the incoming flow of data undergoes an analysis, for example an image analysis, which assesses the type of a process or occurrence (such as the occurrence of an accident or attack) in the environs of the object of interest. The assessment compares structures which are analyzed as being present in the incoming flow of data with stored structures which are associated with a specific set of circumstances or specific situation. The level of agreement between the structures obtained by the analysis with the stored structures delivers a measure of the accuracy of the assessment. When the level of agreement is 75% or more, for example, then the assessment is considered to be sufficiently accurate and the process captured in the vicinity of the object of interest or the occurrence there is associated with the same set of circumstances or the same situation as the stored structure. If the level of agreement is below 75%, for example, then more data from another viewpoint such as, for example, an enlarged image or an image from another angle (perhaps from another camera in the vicinity of the object of interest) is requested from the object for acquiring information. If the level of agreement of 75% is not reached after a second or more attempts, then the assessment is considered to be insufficient and is discarded. The value at which the assessment is considered to be sufficiently accurate is set at 75% in this embodiment. In a further embodiment, the value can be set to any value. The data supplied to the respective local control units for the objects for acquiring information and the central control unit and also the data which is processed and analyzed therefrom is preferably available to all objects.

The local control units for the objects for acquiring information and also the central control unit are configured as hardware by specific electrical/electronic circuits or using software, wherein a computer program is installed in a computer and it then executes the method described above or at least steps thereof.

In the case of a camera, the incoming data may contain information regarding a desired direction of view of the camera, wherein the local control unit for the camera determines the desired direction of view from the incoming flow of data and authorizes the camera to be redirected using appropriate equipment (articulations, motors). In addition, from the flow of data, those cameras out of a plurality of cameras may be selected which, in respect of an incident or an event, deliver the most or the most significant information. The criteria in this regard are in particular the resolution which is desired for a captured object, how much of the object is captured in the image, or which wavelength range is best suited for the actual environmental conditions (infrared at night, for example).

Finally, the resolution or enlargement of the camera may be controlled via the flow of data. Data going from the object for acquiring information can be analyzed by its local control unit and/or be formatted in a manner which is suitable for feeding into the communications network. The level of analysis in this regard can be set at any level. The objects for acquiring information may be stationary in one location, or may be mobile, so that they can be moved to and from a variety of locations.

Furthermore, the system comprises manipulating objects which are designed to exert influence on the objects of interest. Examples of manipulating objects are emergency vehicles, emergency equipment, robots, monitors or loudspeakers. Like the objects for acquiring information, the manipulating objects are connected to the communications network for data transmission, allowing for a uni-directional or bi-directional flow of data. Optionally, the objects for acquiring information may be provided with a local control unit via which the data flows in or out, wherein the flow of data is subjected to a certain level of processing depending on the function of the manipulating object. In the case of emergency equipment or a robot, the incoming data may contain a deployment plan or at least data for specifying a deployment plan, wherein the local control unit of the emergency equipment or the robot analyses the incoming data, requests further information from the objects for acquiring information, from other manipulating objects or from the central control unit and formats outgoing data appropriately for feeding into the communications network. On the basis of the transmitted or specified deployment plan, operations are carried out by the emergency equipment, or robot, which are appropriate to exerting an intended influence on one or more objects of interest. If, for example, an unattended suitcase is detected on the open space, then, for example, pedestrians in the vicinity of the case can be made aware of the danger by activating a loudspeaker or monitor, and emergency equipment or a robot can be sent out to pick up the case and remove it from the open space.

Furthermore, the system has a central control unit which controls an exchange of information with the objects and between the objects and, upon triggering of an alarm, instigates measures for manipulating one or more objects. The communication between the objects can in this regard be direct or via the intermediary of the central control circuit. In each case, however, the central control unit has access to the flow of data between the objects.

The communications network via which information is exchanged between the objects and/or the objects and the central control unit is configured as a mobile phone network, fixed-line network, internet, LAN (local area network), WAN (wide area network) or as a group of at least two of these networks. In this manner, secure communication is ensured between the objects themselves or between the objects and the central control unit independently of the physical circumstances.

The objects and thus also the events captured by the objects and the information transmitted by them are georeferenced. In order to determine the corresponding coordinates, various methods are employed such as GPS tracking, WLAN positioning or positioning by image analysis. During configuration, the coordinates of stationary objects such as doors, cupboards, alarms, fire detectors etc. are input into a configuration software. This is usually carried out semi-automatically wherein, for example, icons for the objects are placed on a map and coordinates thereof are determined. Movable objects such as people or vehicles, for example, carry GPS receivers for GPS tracking which have links to the system and report their current position constantly or when interrogated by the central control unit. With WLAN positioning, specialized methods can be used for mobile phones or special WiFi tags to specify their position in a WLAN and use the same network to transmit this to the system. Furthermore, it is possible to carry out positioning by image analysis, wherein objects are identified in images.

When the same object is captured simultaneously by two cameras, the position of the object can be determined by triangulation if the position of the camera is known.

The properties of the objects for acquiring information are pre-defined as a function of the required portfolio of services. In the case of (video) cameras, for example, a 3D planning tool is used to define the optical properties of the camera to be used. In particular in this regard, the FoV (Field of View) and the resolution of the camera are calculated and stored in the model. The FoV scans a pyramid in three-dimensional space in which the tip is at the camera. In this manner, for every point in time in the scene, it can be determined whether a point of interest lies in the FoV of a particular camera and which resolution of the camera should be used.

The alarm is triggered by remote activation, by means of signals from one or more of the objects for acquiring information or the assessment thereof. The central control unit determines, in communication with one or more of the objects, the reason for initiation of the alarm, the objects of interest concerned and their position and, on the basis of a comparison with stored earlier events and the corresponding reactions, specifies the reaction which should be the response to the alarm. Depending on the reaction specified, the availability of the manipulating objects and their qualification for bringing about the specified reaction and their estimated time of arrival at the scene at which the specified reaction is to occur, the central control unit selects the manipulating objects which can bring about the specified reaction and sends them to the scene or to the location of the object of interest. To calculate the principle accessibility of the task location, the estimated time of arrival and the proposed route, the georeferences of the start and target points are taken into consideration. The optimal route is calculated using known algorithms such as the A* algorithm applied to appropriate map material. By modelling the environment in 3D, additional problems such as the planning of routes for airborne craft (for example drones) can be taken into consideration.

In the case in which security forces are deployed, the success of the manipulating or the specified reaction depends to a large extent on the context such as, for example, the accessibility of the scene (depends on the available vehicles), environmental considerations as well as cultural considerations (language) at the scene. The abilities of the personnel and the accompanying deployment means is provided via databases. Thus, in the case of the language skills of personnel, courses taken and other qualifications may be stored and can be interrogated.

The present invention will now be described with reference to the deployment of security services as an example, however the example does not in any way limit the invention.

The deployment of security services is dependent on the circumstances. An event may originate from a burglar alarm or a pedestrian might report an incident. The course of events will become apparent from the following scenario.

The Situation i. "best cam" function. The system calculates all cameras which can show the location of the event. The operator receives a list of qualification criteria (for example resolution) and can watch the appropriate video streams.

ii. "nearest guard" function. The system calculates the estimated times of arrival for the security services in the area using the route and traffic. Further criteria such as language (fight in an Indian restaurant) can be evaluated qualitatively using the stored personal data. This produces a ranking of the fastest and/or best emergency personnel. Furthermore, the system knows which security services are currently deployed in other locations.

iii. "air reconnaissance". If available, drones can be launched and steered automatically to the deployment location in order to transmit images or video streams from it.

Deployment of Emergency Personnel

On the basis of the situation and the available/suitable security services, the deployment order can be given manually or automatically. At the same time, the set of data which is available at that time is uploaded to mobile data processing devices. This may also contain the proposed routes, instructions, further information regarding the crime scene and suspects.

On-Site Deployment

On-site deployment is rolled out as a function of the location and the circumstances. The system supports the security services in the fact that with the aid of a special app, they can document the incident in a manner which can be used by the courts. In this regard, a sketch of the scene can be drawn up. Witness statements are taken by voice recordings, photos and videos of the crime scene and the course of events can be drawn up. The data can be collected together into a common event or incident and sent in this form as a package to the center (central control unit) or to central evidence storage. The sketch of the crime scene as well as images or videos are drawn up automatically, in particular under the watch of the local control units for the objects for acquiring information and/or the central control unit.

Incident-Related Assessment

During the course of events, actions, communications etc. which are carried out can be logged. At the end of the deployment, these data are joined together with the data from the crime scene. Together with a final report, the whole incident is sent to long-term storage. Since all data are georeferenced and time-logged, they can be presented in court in a multimedia manner as a timeline and in a physical context (using a map).

The data are sent using the usual methods. To and from mobile devices, data is transmitted via WLAN or 3G/4G. The channel is encrypted and secured with a certificate. In a local network or the www, encrypted transmission is also employed. The components communicate with each other via web or REST services. Uploading or downloading here is identical to www mechanisms.

The embodiments of the present invention will now be explained from another viewpoint with the aid of the figures.

FIG. 1 shows the control center of a security undertaking (for example the police), with three operators at their work stations in the foreground and a monitor or screen with a locational image of a location in the background.

If an emergency call comes into the control center then, as shown in FIG. 2, a window opens in the locational image with a plurality of fields. The first line ("Emergency call—update information") shows that an emergency has just occurred and provides initial data. Here, the emergency call is by telephone, wherein with the aid of the telephone number, the data "Who" (left hand column): Carrier ID (telephone number of caller), Name (caller), Carrier (telephone company), Address (address of caller) as well as "When" (right hand column, top): Date (today), Time (here 23:13:25) and Time Zone (here CET, Central European Time) of the call are displayed. Under "Where" (right hand column, bottom) is the geodata or geocoordinates (latitude-longitude) of the location at which the incident is occurring or has just occurred. As an example, the geodata may be obtained indirectly via the telephone number of the GSM cell or by specifying the location by inputting the location, street name and house number by the caller and automatically calling up the associated geodata from a register. It should be noted in this regard that the above data have been called up automatically in FIG. 2.

Figure 3:
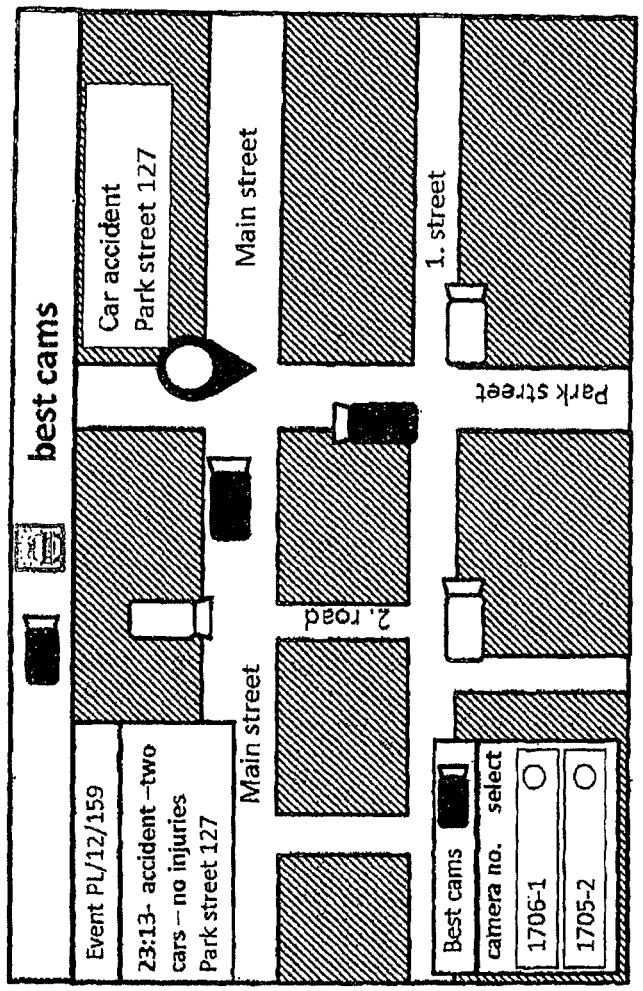
FIG. 3 shows the screen of a map with the scene of an incident as well as (video) cameras in the immediate vicinity of the scene.
Figure 4:
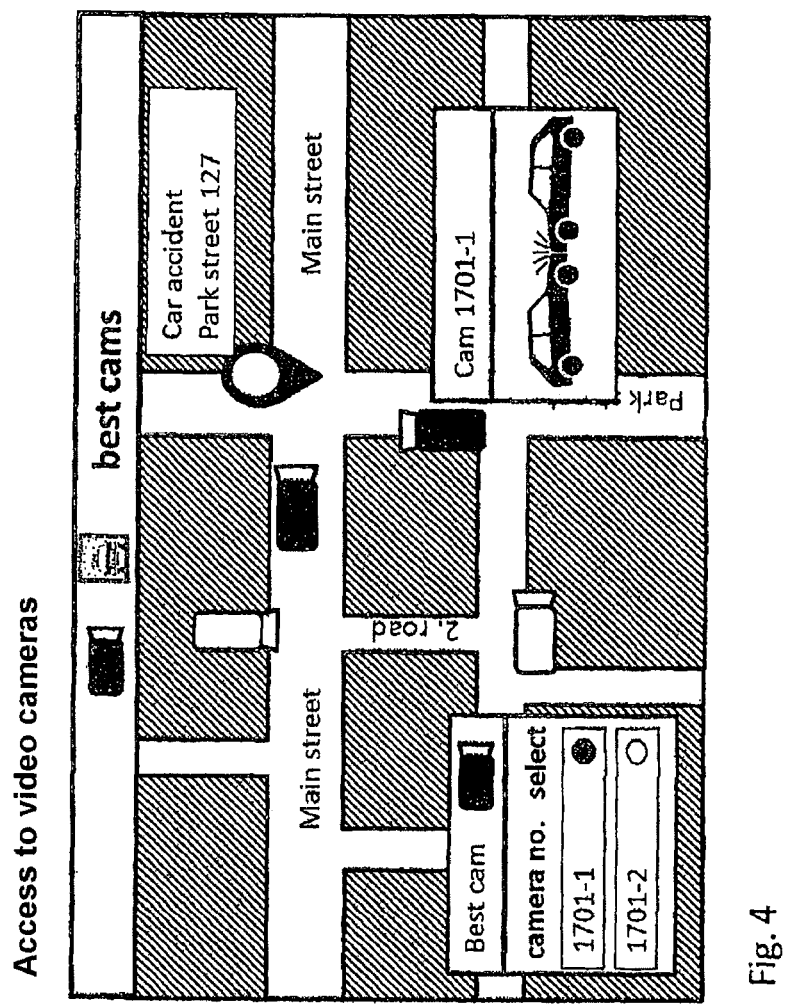
FIG. 4 shows the screen of the map of FIG. 3 with the image from a selected best cam in a window thereof.

FIG. 3 shows the next step in the method (Best cam function) wherein, on the basis of the geodata already at hand, the system determines those cameras from the plurality of (video) cameras which are available, in grey on the map, and highlights (shown in blue) those which can best represent the crime scene. The crime scene itself here is shown by an arrow marked in blue. In a window/field on the right at the top, the type of incident (Car accident) and the associated address (Park Street 127) are displayed. The upper left window in the image contains, in the upper field, the data for the event (Event number PL/12/159), time (23:13), type of incident (Accident—two cars—no injuries) as well as data pertaining to the caller. In the field at the bottom, the cameras (Best cams) of the plurality of cameras of the system which can best show the incident are listed. One or more cameras are selected out of this list, to show the incident. In this manner, the system automatically selects from a host of information the means which are the best suited and allows one (or more) information means to be selected, as can be seen in FIG. 4, wherein camera 1701-1 is selected as the Best Cam and the image or video from it is shown in a further window on the screen.

Figure 5:
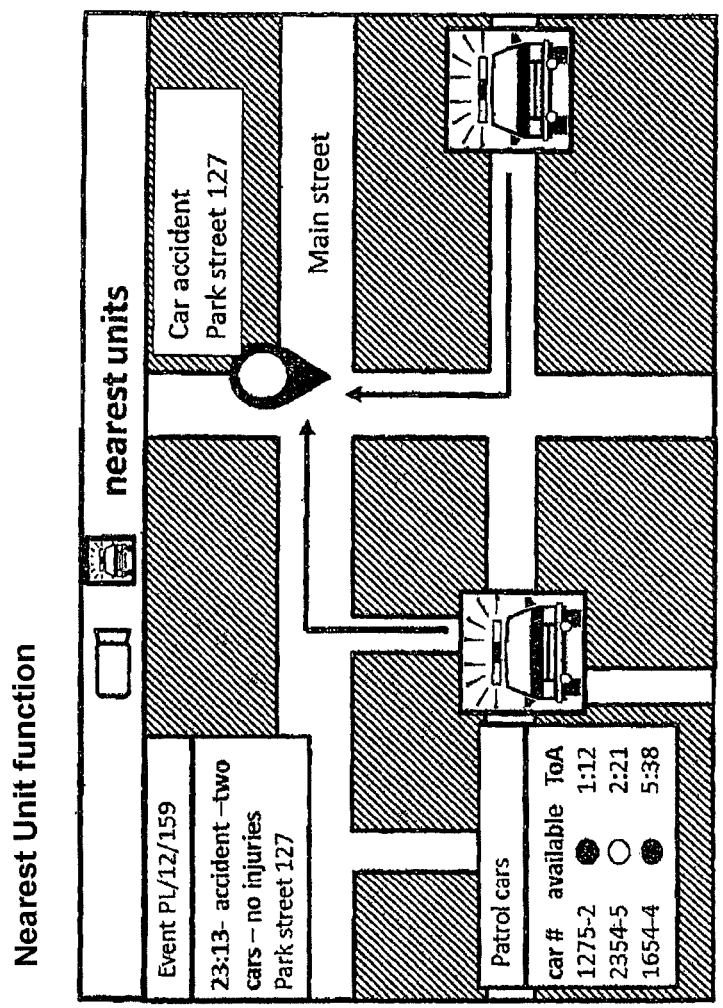
FIG. 5 shows the screen of the map of FIG. 3 and emergency personnel or vehicles in the vicinity of the scene as well as the computation and display of routes from the current position of the emergency personnel to the scene.

Next, as can be seen in FIG. 5, the system determines the nearest emergency personnel (green highlighted vehicles) to the scene, the respective routes to the scene and the estimated arrival time at the scene and shows it on the field on the lower left on the screen; this function is called the Nearest unit function. The blue lines symbolize that, with respect to the respective emergency personnel/emergency vehicles, a route calculation and an assessment of the estimated time of arrival is already being carried out. The representation on the corresponding field is due to data regarding the respective emergency vehicle (car number), the availability of the respective emergency personnel (green: emergency team available, red: emergency team unavailable) and estimated time of arrival of the emergency personnel at the scene (Time to arrival). At the bottom of the right hand side, an unavailable emergency team or emergency vehicle is shown as an example (highlighted in red). The above determination or calculation as regards the "Nearest unit" function by the system is again carried out automatically.

Figure 6:
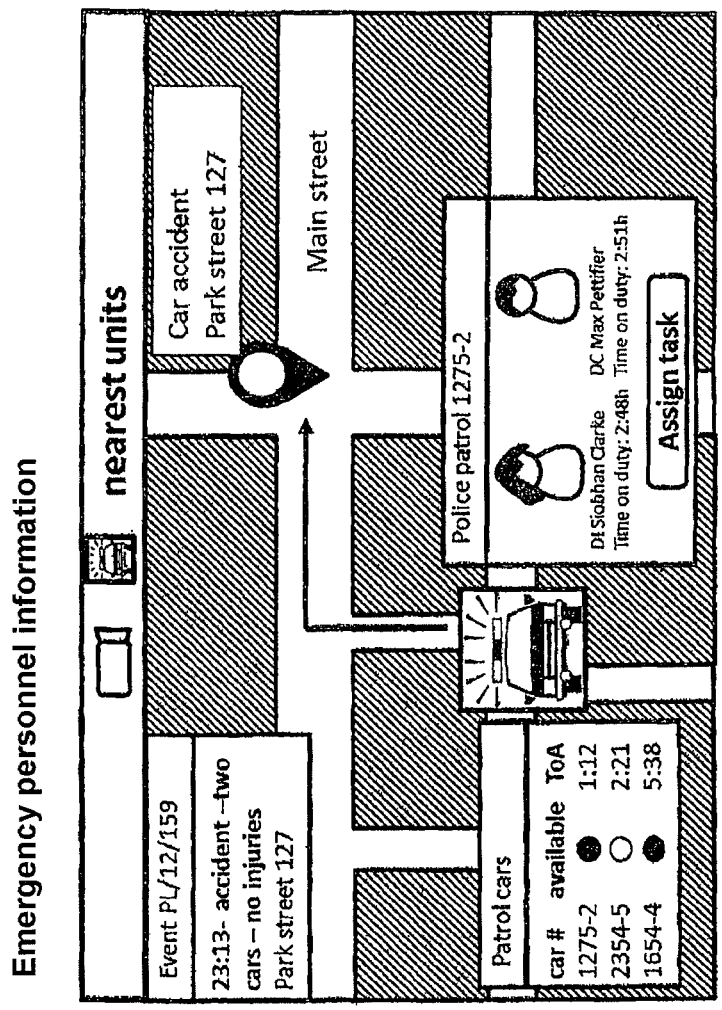
FIG. 6 shows the screen of the map of FIG. 3 showing the personnel of an emergency team.

Building on the "Nearest unit" function of FIG. 5 is the possibility of calling up quality characteristics or criteria. In a semi-automatic process, the operators shown in FIG. 1 have the opportunity, by clicking on "Car number" in FIG. 5 or FIG. 6, to call up quality characteristics of the available emergency personnel. If, for example, as shown in FIG. 6, the Car number 1275-2 is selected, then the entire emergency team appears on the screen in a window, in this case a policewoman and her male colleague, wherein in the window which is, for example, below the respective individual, characteristics or features of them such as mother tongue, foreign languages (Level), additional training etc. can be displayed. If the scene is in an area in which Turkish is the dominant language, then the personnel of the control center would have the opportunity to preferentially send emergency personnel to the scene who can speak the generally spoken language. In an automatic process, it would also be possible to view the quality features from the outset. In this case, the system would recognize that it would be advantageous for the emergency personnel to speak the language most widely spoken at the scene and would automatically select such an emergency team (if available) for the task and send it to the scene.

Figure 7:
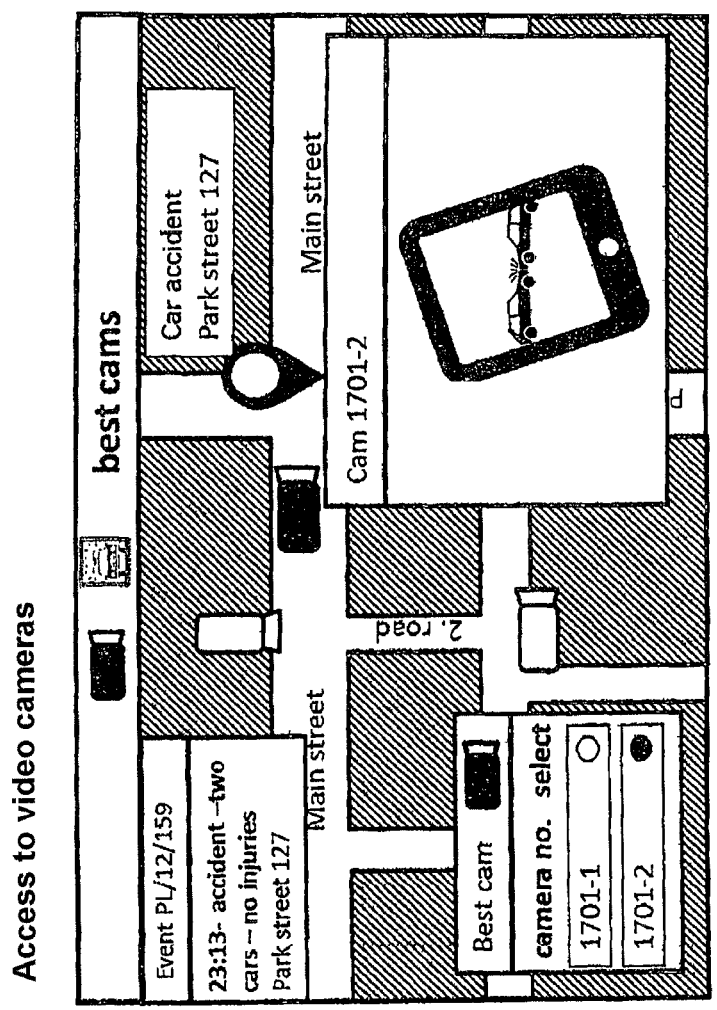
FIG. 7 shows the screen of the map of FIG. 3 and the image of the scene by an emergency personnel using means available to the emergency personnel.

FIG. 7 shows the situation in which the emergency team has been sent to the scene by the system. A member of the emergency team is already there to take pictures from the scene, wherein the incident/event is also captured by the Best cam function via camera 1701-2.

Figure 8:
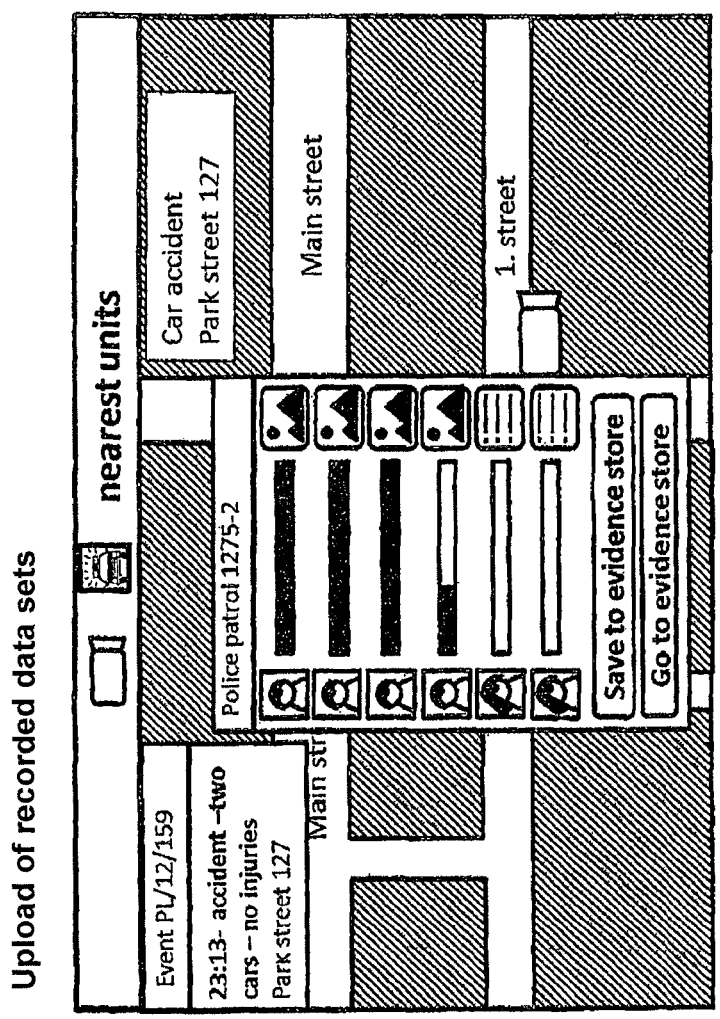
FIG. 8 shows the screen of the map of FIG. 3 and in a window thereof, data sets produced at the scene as well as their transmission status.

FIG. 8 shows that at the scene, six sets of data have been raised by the emergency personnel (four from the male policemen and two from his female colleague), wherein the first three data sets have already been uploaded and transmitted via telephone/3G to the control center, the fourth data set is not yet fully uploaded and transmitted, and the last two data sets are simply extant and the process of uploading and transmittal has not yet been begun. The available data sets are thus automatically sequentially uploaded (Upload Process) and also automatically transmitted to the control center and assigned to the event.

FIG. 9 shows a list of all of the events/incidents processed and stored in the system, wherein the top incident and thus has been inserted for the purposes of overview. The top incident contains all data (sets) which have been recorded at the scene (see FIG. 8) as well as data which was known to the system right at the start of the event or incident when the alarm was initiated (see FIG. 2). The data (sets) can be seen by the personnel of the control center or can be selected and can be analyzed as required. The selection or analysis of the event can be carried out semi-automatically, i.e. under the control of the personnel of the control center, or fully automatically, i.e. by the system alone without the personnel of the control center having to intervene.

In the embodiments explained in the figures, the object of interest corresponds to the road intersection indicated on the map by an arrow, the object for acquiring information corresponds to one of the (video) cameras highlighted in blue or grey among the many cameras, the manipulating object corresponds to one of the many emergency vehicles highlighted in green or red and also the equipment it contains for recording and/or logging the accident, and the central control unit corresponds to the computer in the control center.

The invention claimed is:

1. A system for monitoring and manipulating at least one object of interest comprising:
a camera for acquiring information about the at least one object of interest, the at least one object of interest being selected from a group consisting of buildings, roads, road intersections, and open spaces;
at least one manipulating object selected from a group consisting of an emergency vehicle, an emergency equipment, and a robot, the at least one manipulating object exerting influence on the at least one object of interest;
the camera and the at least one manipulating object are subject to georeferencing by assigning coordinates showing a position of the camera and the at least one manipulating object, the system further comprising:
a central control unit which is coupled to the camera and the at least one manipulating object, the central control unit controls an exchange of information with or between the camera and the at least one manipulating object, and requests further information from the camera in response to triggering of an alarm and based on the information from the camera, the central control unit authorizes the at least one manipulating object to instigate measures for manipulating the at least one object of interest; and
a communications network exchanging the information between the camera and the at least one manipulating object and between the camera and the at least one manipulating object and the central control unit, wherein the camera and the at least one manipulating object are connected to the communication network allowing a unidirectional or bidirectional flow of data.

2. The system as claimed claim 1, wherein the camera is in a stationary or a mobile position.

3. The system as claimed in claim 1, wherein the georeferencing of the camera is carried out by assigning coordinates, with aid of a list, by GPS tracking, WLAN, WiFi-based positioning or image analysis.

4. The system as claimed in claim 1, wherein the alarm is initiated by a remote message or signals from the camera.

5. The system as claimed in claim 1, wherein the communications network is configured as a mobile phone network, fixed-line network, internet, LAN (local area network), WAN (wide area network) or as a group of at least two communications networks.

6. The system as claimed in claim 1, wherein the camera and/or at least one of the emergency vehicle, the emergency equipment, or the robot each have a local control unit which controls an associated object and/or an incoming or an outgoing communication.

7. The system as claimed in claim 6, wherein the central control unit is configured to select the at least one of the emergency vehicle, the emergency equipment, or the robot and send a deployment order to the selected at least one of the emergency vehicle, the emergency equipment, or the robot with instructions to deploy to a scene, as a function of a specified reaction, availability of the at least one of the emergency vehicle, the emergency equipment, or the robot as well as a qualification for implementing the specified reaction and an estimated time of arrival at the scene at which the specified reaction is implemented.

8. The system as claimed in claim 7, wherein the central control unit is configured to compile deployment plans for the selected at least one of the emergency vehicle, the emergency equipment, or the robot, for bringing about the specified reaction.

9. The system as claimed in claim 7, wherein the central control unit is configured to authorize the selected at least one of the emergency vehicle, the emergency equipment, or the robot at the scene to prepare witness statements, action logs and/or final reports.

10. A method for monitoring and manipulating information regarding buildings, roads, road intersections, or open spaces, the method comprising:

acquiring the information using a camera, located about the buildings, the roads, the road intersections, or the open spaces;

exerting influence using an emergency vehicle, an emergency equipment, or a robot on the buildings, the roads, the road intersections, and the open spaces;

georeferencing the camera and the emergency vehicle, the emergency equipment, or the robot by assigning coordinates and showing a position of the camera;

carrying out a central control of the camera and the emergency vehicle, the emergency equipment, or the robot, whereupon the central control includes, exchanging the information with and between the camera and the emergency vehicle, the emergency equipment, or the robot, requesting further information from the camera in response to an alarm based on the information from the camera and authorizing the emergency vehicle, the emergency equipment, or the robot to carry out measures to influence the buildings, the roads, the road intersections, or the open spaces based on the information from the camera;

providing a communications network via which the information is exchanged between the camera and a central control unit; and connecting the camera and the emergency vehicle, the emergency equipment, or the robot, to the communications network allowing a unidirectional or bidirectional flow of data.

* * * * *